United States Patent [19]

Logan

[11] Patent Number: 4,638,373
[45] Date of Patent: Jan. 20, 1987

[54] METHOD AND APPARATUS FOR IMPROVING GRAY SCALE RESOLUTION IN AN INK JET PRINTING SYSTEM

[75] Inventor: David J. Logan, Glastonbury, Conn.

[73] Assignee: Metromedia, Inc., Secaucus, N.J.

[21] Appl. No.: 708,744

[22] Filed: Mar. 6, 1985

[51] Int. Cl.$^4$ .................. H04N 1/21; G01D 9/00; G01D 15/16

[52] U.S. Cl. .................. 358/298; 346/1.1; 346/140 R; 358/296

[58] Field of Search .......... 346/1.1, 75, 134, 140 PB; 358/296, 298, 280, 283

[56] References Cited

U.S. PATENT DOCUMENTS 3,604,846  9/1971  Behane et al. .................. 346/140
4,084,259  4/1978  Cahill et al. .................. 358/296

Primary Examiner—E. A. Goldberg
Assistant Examiner—Linda M. Peco
Attorney, Agent, or Firm—McCormick, Paulding & Huber

[57] ABSTRACT

Image processing apparatus for increasing the gray scale resolution of a graphic generated by an ink jet printing system wherein the graphic is made up of pixel areas on a receiving surface and each pixel area is comprised of a fixed number of potential dot positions printed with substantially equal sized dots. A sequential series of image density signals representative of the gray scale color intensity is generated from an original graphic and converted to a dot level value for each pixel. A pixel's dot level value is compared to a set of integer and non-integer values and pixels having dot level values falling between the same two successive integer values are selected. A predetermined dot level value is alternately added to the identified adjacent pixels so that one is increased and the other is decreased by the predetermined dot value. The resulting values are rounded off to the nearest integer and each pixel is printed with its respective new value. The resulting gray scale color intensity represented by the two printed pixels is the average of the sums of the two printed pixels' dot level values.

4 Claims, 6 Drawing Figures

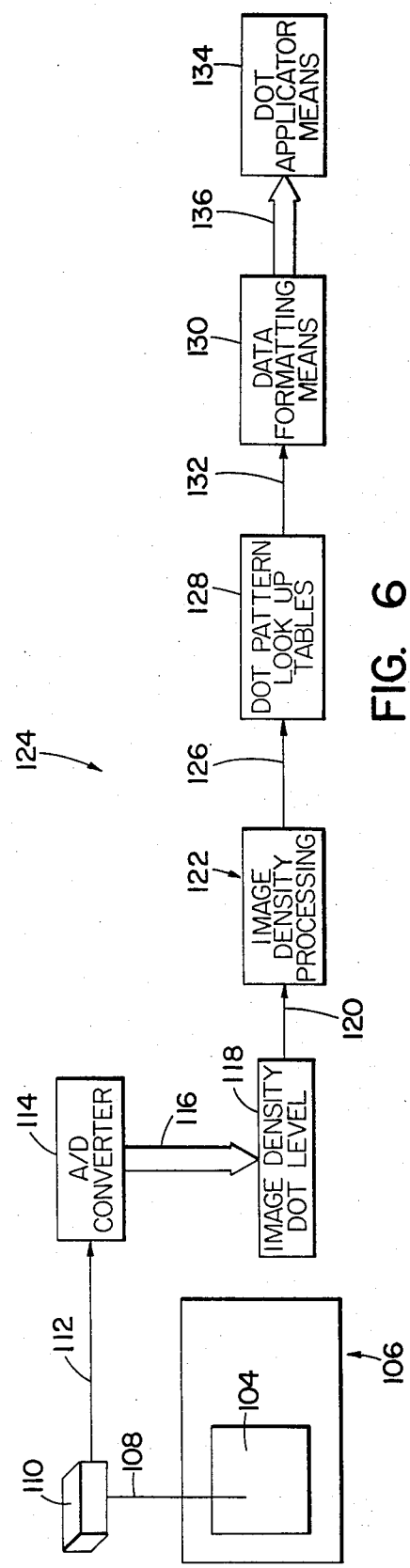

METHOD AND APPARATUS FOR IMPROVING GRAY SCALE RESOLUTION IN AN INK JET PRINTING SYSTEM

BACKGROUND OF THE INVENTION

This invention relates generally to image processing and deals more specifically with an apparatus and related method for improving the gray scale resolution of a graphic made up of pixel areas on a receiving surface wherein each pixel area is comprised of a fixed number of potential dot positions printed with substantially equal sized dots.

It is generally well understood in the ink jet printing art to vary the number of dots applied to a pixel area also referred to herein as a pixel to produce shades of gray. The number of shades of gray are directly related to the number of potential dot positions that may be printed within a pixel area and one such system is disclosed by Behane in U.S. Pat. No. 3,604,846 issued Sept. 14, 1971 and entitled METHOD AND SYSTEM FOR RECONSTRUCTION OF HALF-TONE IMAGES. One drawback in generating half-tone images using a fixed number of potential dot positions printed with substantially equal sized dots, such as, for example, as described by Behane, is that only an integral number of gray scale values can be generated. Thus, an image density having a corresponding gray scale value falling between two successive integer values must be rounded upward or downward to the nearest integer and the associated pixel area is printed to produce a gray scale value corresponding to the rounded off integer. If a number of adjacent side-by-side pixels have gray scale values falling between the same two successive integer values, then those pixels also have their respective gray scale values rounded to the nearest integer each pixel having the same value. The resulting graphic is printed with the rounded off gray scale values rather than the gray scale values corresponding to an original graphic to be reproduced. It is desirable therefore to improve the gray scale resolution of printed pixel areas comprising a graphic so that the resulting printed gray scale more accurately approximates the gray scale values of the original graphic.

An increase in gray scale resolution is especially desirable in the production of large-scale, color graphics such as, for example, outdoor advertising billboards and signs or displays for use in railroad or airport terminals, shopping malls and other open public areas wherein the graphics are generated from polychromatic half-tone pixel areas created by applying relatively large volume ink drops of substantially equal size to a fixed number of potential dot positions comprising pixel areas of the receiving surface.

It has been observed that one way to effectively achieve an increase in gray scale resolution for adjacent side-by-side pixel areas having gray scale values falling between the same two successive integer values is to print each of the two adjacent pixel areas using integer values such that the average gray scale value produced by the two printed adjacent pixel areas falls between the successive integer values because the human eye tends to integrate the graphic area focused upon and sensed the average gray scale reflected from the adjacent pixels of the receiving surface.

A general aim of the invention is therefore, to provide an apparatus and related method for increasing the gray scale resolution of pixel areas of a receiving surface without increasing the number of potential dot positions that may be printed within the pixel to produce a finished graphic that is of high quality and having a gray scale value that more nearly approximates the image density of an original graphic.

These general aims are achieved in accordance with the invention, and as described in more detail hereinafter, by image density processing apparatus that increments and decrements in each of two adjacent pixel areas a predetermined dot level value so that the image density of each of the pixel areas corresponds to a dot level value falling between the same two successive integer values whereby the incremented value pixel and decremented value pixel are averaged together so that the resulting gray scale produced by the two adjacent printed pixel areas more nearly approximates the gray scale value corresponding to the image density of an original graphic measured at those corresponding pixel areas.

Other objects and advantages of the present invention will be apparent from the following written description and claims taken in conjunction with the accompanying drawings.

SUMMARY OF THE INVENTION

The invention resides in image density processing apparatus and a related method for increasing the gray scale resolution of a generated graphic produced by an ink jet printing system. The system includes means for controlling and operating ink jet printing means to apply or not apply substantially equal sized dots of one color to a plurality of pixel areas located sequentially along a line scanned by the printing means. Each of the pixel areas has potential dot positions which form an array identical for all pixel areas and to which ink drops are applied so that a number of such printed pixel areas form the desired graphic.

In accordance with the invention, a sequential series of image density signals substantially representative of the gray scale color intensity level associated with a respective pixel area is produced and each of the density signals are converted to a dot level value. The dot level value of each pixel is compared to a number of sets of values, at least one set including integer values and another set including non-integer values where each integer value corresponds to one of N integral color intensity levels that may be represented by printing dots in the pixel dot position array. Non-integer dot value adjacent side-by-side pixel areas are identified and those having values falling between the same two successive integer values are selected. A predetermined dot level value is added to or subtracted from the identified adjacent pixels so that the dot level of one of the pixels is increased by said predetermined value and the dot level of the other of the adjacent pixels is decreased by said predetermined value. The resulting dot level is rounded off to the nearest integer value and each of the pixels is printed in accordance with the resulting dot level so that the gray scale color intensity level represented by the two printed pixels is the average of the sum of the two printed pixels' dot level values.

BRIEF DESCRIPTION OF THE DRAWINGS

FIG. 6 is a block diagram showing the major functional components of the image density processing apparatus of FIG. 1.

DETAILED DESCRIPTION

Figure 1:
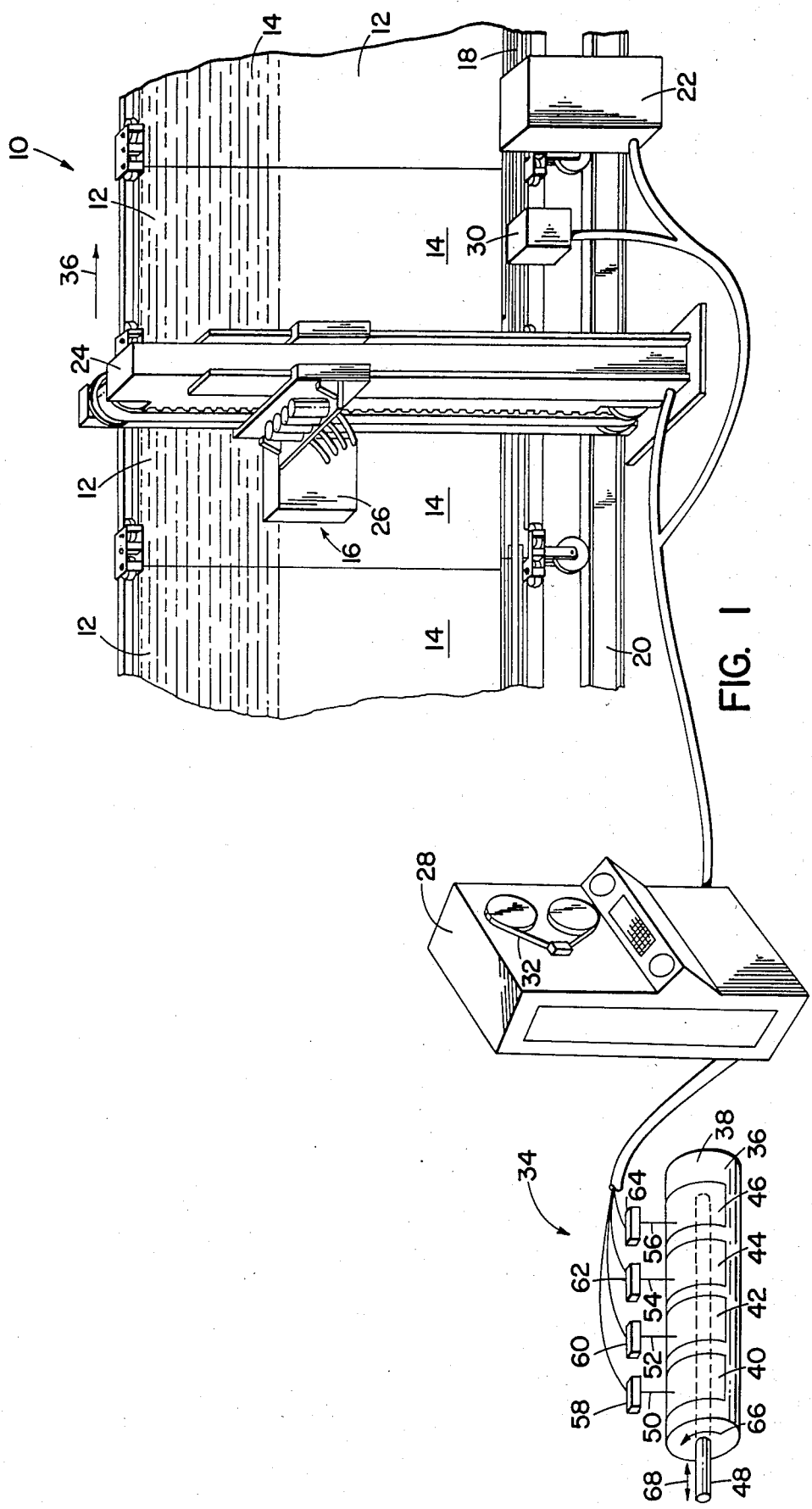
FIG. 1 is a fragmentary perspective view showing a large-scale graphics generating ink jet printing system including image density processing apparatus embodying the present invention.

Referring now to the drawings, the apparatus and method of the present invention are shown by way of example as embodied in a large-scale graphics generating ink jet printing system designated generally by the numeral 10. Briefly, a plurality of flat panels 12, 12 collectively providing a receiving surface 14 move in an endless path edgewise and rectilinearly in succession past an ink jet printing station 16. The panels 12, 12 are moved on an endless carrier 18 supported by a track 20 and propelled by a power unit 22 located near the printing station 16. The printing station 16 includes a vertical column 24 for slidably supporting a carriage 26 for vertical movement relative to the column, the carriage 26 in turn supporting at least one ink jet head for printing ink dots of substantially fixed size onto the outwardly directed surface 14 of each panel 12 as it passes the printing station. During operation of the system, the panels move in the direction of arrow 36 and each ink jet printing head of the printing station ejects ink drops onto the faces on the panels with the drops moving from the nozzle to a panel along a substantially horizontal line of flight, so that each time a panel passes the printing station the drop ejected by a printing head, if it is operating at that time, falls on a horizontal scan line. Further, the vertical movment of the carriage 26 and of the carrier 18 is coordinated so that with each full revolution of the carrier about its endless path, the carriage 26 is moved downwardly by a given increment so that each time a panel passes the printing station each ink jet printing head of the printing station scans a line on the panel which is new to it.

The operation of the ink jet printing heads and the movement of the carriage 26 is controlled by a controller such as, for example, a computerized controller 28. Timing of the excitation of the printing heads is slaved to the motion of the carrier 18 and to a carrier position encoder unit 30. Graphics information controlling the excitation of the ink jet printing heads to cause each head to either print or not print a dot at each potential dot position on the surface of each panel may be supplied to the controller 28 in the various different ways. For example, it may be in the form of preprocessed information recorded onto a magnetic tape 32 read by the controller, or it may be supplied by a scanner 34 associated with the controller 28.

By way of illustration and example it is assumed in the following discussion that the graphics generating system of FIG. 1 generates polychromatic graphics and the scanner 34 is shown as one adapted for use in printing in a four color polychromatic half-tone manner. The scanner 34 includes a transparent drum 38 onto which four color separation negatives 40, 42, 44 and 46 may be mounted in registration with one another, each negative being a continuous tone one prepared from the original artwork to be reproduced on the panels 12, 12. That is, the negative 40 may be a black separation negative, the negative 42 a cyan separation negative, the negative 44 a magenta separation negative and the negative 46 a yellow separation negative. Within the drum 38 is a device 48 emitting four laser beams 50, 52, 54 and 56 passing through respective ones of the separation negatives and detected by associated photodetectors 58, 60, 62 and 64. The drum 38 is rotatable about its central axis in the direction of the arrow 66 and the four laser beams 50, 52, 54 and 56 are movable in unison along the axis of the drum as indicated by the arrow 68. Each time the panel carrier 18 undergoes one full revolution the scanner executes one read cycle during which it reads one line of information from the negatives 40, 42, 44 and 46. In each such cycle the drum 38 is rotated a one revolution and the laser beams 50, 52, 54 and 56 are then moved across the negatives 40, 42, 44 and 46 to produce image density information from the detectors 50, 52, 54 and 56 which information is manipulated by a set of instructions contained within the apparatus of the present invention and processed by the controller 28 to control the operation of the ink jet printing heads during one revolution of the carrier 18. The controller 28 includes a buffer memory for temporarily storing one or more lines of image density information from the detectors 58, 60, 62 and 64, so that during one revolution of the carrier the ink jet controlling information used to excite the printing heads is information obtained by the scanner 34 and processed by the controller 28 during a preceding revolution of the carrier.

Figure 2:
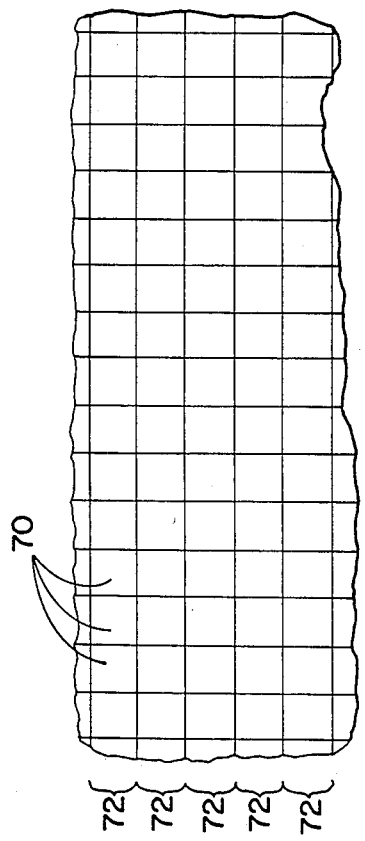
FIG. 2 is an enlarged fragmentary view showing a portion of a panel surface and illustrating the manner in which the surface is divided into pixel areas and pixel bands by the graphics generating system of FIG. 1.

Although the system preferably is used to generate polychromatic half-tone graphics using a number of ink jet printing heads for printing four different colors, the printing station 16 may be equipped with a single ink jet printing head for generating monochromatic graphics. It is also assumed herein that the half-tone printing process involved uses square pixels each of which is measured one-tenth inch on its side. As shown in FIG. 2, the pixels are indicated generally at 70, 70 and are arranged end-to-end in successive side-by-side horizontal bands 72, 72.

Figure 3:
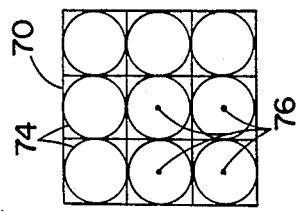
FIG. 3 is an illustration showing the arrangement of potential ink drop positions within one of the pixel areas of FIG. 2.

Referring to FIG. 3, each pixel 70, contains nine potential dot positions represented generally by the circles 74, 74, having centers 76, 76, the centers 76 therefore being spaced 0.033 inches from one another along both horizontal and vertical lines in the case of a one-tenth inch pixel. The pixel has nine potential ink dot positions and accordingly such a three-by-three matrix pixel is capable of producing ten different color intensity levels or gray scale graduations, the lowest level being one and corresponding to no dots being printed which level correlates to the maximum amount of light passing through the separation negative at a given image sensing point and ten being the highest level and corresponding to all of the dot positions being printed which level correlates to no light passing through the separation negative at a different image sensing point, each point being associated with a corresponding pixel to be printed. In the case of a three-by-three matrix pixel, the color intensity levels possible from such a matrix pixel have one of N integral values, where N is an integer value ranging from one to ten.

When a detected or measured color intensity level has a value falling between two successive integer value intensity levels, the detected or measured intensity level is either rounded up or down to the nearest integer value and consequently the color intensity produced at the corresponding associated pixel location does not accurately represent the measured color intensity. In accordance with the present invention, the gray scale resolution available from a pixel having a fixed number of potential dot positions that can be printed with substantially equal sized dots to represent a desired color intensity for a given area of the graphic comprising two or more adjacent or side-by-side pixels can be increased to produce a color intensity having a dot level value falling between two successive integer values as explained hereinbelow.

Figure 4:
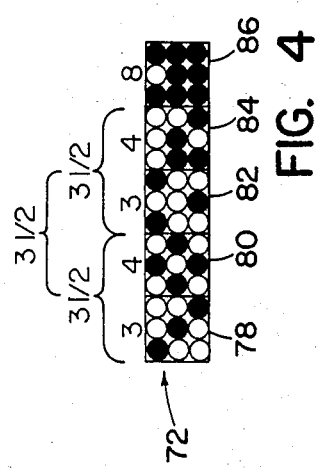
FIG. 4 is an illustration showing several side-by-side pixels in a pixel band printed in accordance with image density information determined by the apparatus of the present invention.

Considering now FIG. 4, several side-by-side pixels 78, 80, 82, 84 and 86 representative of a pixel band generally designated 72 are illustrated therein. Each one of the pixels 78, 80, 82, 84 and 86 is comprised of nine potential dot positions that may be printed in accordance with graphic information provided by the controller 28. In the illustrated example of FIG. 4, it is assumed that the image density level detected by the scanner 34 for an area of the graphic having associated pixels 78, 80, 82 and 84 corresponds to a color intensity level falling between two successive integers such as, for example, 3 and 4. As stated hereinabove, the number of color intensity levels in a three-by-three matrix pixel are restricted to the number of dot positions that can be printed within the pixel and in this case ten levels. An effective increase in the gray scale resolution for the given graphics area corresponding to pixels 78, 80, 82 and 84 is achieved by detecting and measuring the image density level at the corresponding location on the separation negative, storing the density information and comparing the density information retained for the side-by-side pixels 78, 80, 82 and 84 in the pixel band 72. If two adjacent side-by-side pixel areas are determined to have color intensity levels falling between the same two successive integer values, then the measured image density level can be more accurately approximated by printing a number of dots in each of the two adjacent pixels such that the average of the sum of the dots printed in the two pixels produces an intensity level that more closely corresponds to the measured image density level for the respective associated pixels' area of the graphic.

Still referring to the example depicted in FIG. 4, in accordance with the invention the average of the sum of the dots in adjacent pixels 78 and 80 to produce a color intensity level corresponding to $3\frac{1}{2}$ for the area covered by the two pixels is achieved by causing three dot positions to be printed in pixel 78 and four dot positions to be printed in pixel 80. If the next immediately adjacent pixel, for example, pixel 82, is also determined to have an image density level corresponding to a dot level of $3\frac{1}{2}$, then the number of dot positions printed in pixel 80 is subtracted from the sum of the dots which sum when averaged produces a color intensity level equal to $3\frac{1}{2}$. In this case, the total number of dots printed in the two adjacent pixels 80 and 82 is equal to seven and since four dot positions are printed in pixel 80, three dot positions (7-4) are printed in pixel 82 so that the color intensity produced in the area covered by pixels 80 and 82 has an average of $3\frac{1}{2}$ dots per pixel. It can be seen that if the next immediately adjacent pixel area such as, for example, pixel 84, is also determined to have an image density level corresponding to a dot level of $3\frac{1}{2}$, then the number of dot positions printed in pixel 82 is subtracted from the sum of the dots which sum when averaged produces a dot level of $3\frac{1}{2}$. Four dot positions are printed in pixel 84 to produce a color intensity level corresponding to a dot level of $3\frac{1}{2}$ for the area covered by pixels 82 and 84.

The image density level information for each pixel area is manipulated by the program of the invention in the same manner as above for each pixel along the scan line having a color intensity level falling between the same two successive integer values until a pixel area having an image density level corresponding to a color intensity level having an integer dot level value is determined or until a pixel has a color intensity level corresponding to a dot level value which when compared to the previous immediately adjacent pixel dot level value is greater than one dot level above or below the average dot level associated with immediately preceding pixel. For example, in the illustration of FIG. 4, if it is determined that pixel 86 requires eight dot positions be printed to achieve the color intensity level corresponding to the measured image density level sensed at the associated pixel area on the separation negative, the program recognizes that the dot level value of pixel 86 does not fall between the same two successive integer values that pixel 84 did and therefore does not add and average the dot level values of pixels 84 and 86. If the dot level values of pixels 84 and 86 were added and averaged, a color intensity level equal to a dot level value of six for the area covered by the two pixels would be produced. Consequently, the apparatus of the invention distinguishes transitions in image density levels between adjacent side-by-side pixels as each pixel image density level in a pixel band is detected and measured to prevent averaging of adjacent pixel dot values when corresponding color intensity levels for those pixels are separated by one or more intensity levels.

Figure 5:
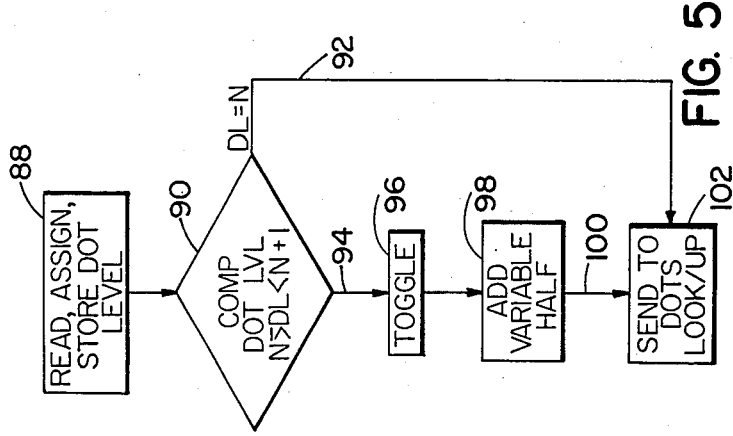
FIG. 5 is a flowchart of the program for manipulating the image density information to determine the number of dots to be printed in a pixel areas.

Considering now FIG. 5, a flowchart of the program for manipulating image density level information to provide the required number of printed dots in immediately adjacent side-by-side pixels in a pixel band to produce a desired color intensity level including intensity levels having dot level values falling between two successive integer values is shown therein. The number of dot positions to be printed in each pixel comprising the graphic is determined in accordance with the discussion of FIG. 6; however, for purposes of explanation of the flowchart of FIG. 5, it is assumed that the program causes the dot level value, that is, the number of dot positions to be printed corresponding to the detected image density level, to be read by the image processing apparatus and assigns and stores the numerical dot level value of its respective associated pixel area through means contained within function block 88. The dot level value information read in function block 88 is sent to comparison means contained within function block 90 which compares the dot level value read in 88 to the set of integer values that can be produced in a pixel area to determine if the dot level value falls between two successive integer values or is equal to an integer value. If the dot level value is equal to one of the N integer values, then the program causes the apparatus to carry via 92 the information containing the integer dot level value for the respective associated pixel area to an information formatting function block 102 as explained below. If the dot level value falls between two integer values, that is, between the values N and N+1, then that dot level value information is sent via 94 to a toggle function block 96.

The toggle 96 has means, such as a flip-flop, to condition means in a add variable half function block 98 to increment and/or decrement a dot level value falling between two successive integers for a pixel area so that in the case of adjacent side-by-side pixels having a dot level value falling between the same two successive integer values, the average of the sum of the two pixels' dot values fall between the two integer values so that the resulting color intensity level corresponds to a dot level value between the two successive integer values.

The dot level value determined for each of the immediately adjacent side-by-side pixels is sent via lead 100 to formatting function block 102 the output of which is used by a dot pattern look-up table as explained below in conjunction with FIG. 6.

Considering the add variable half function block 98 of FIG. 5 in more detail, a +½ or a −½ is added to the dot level value read by function block 88 depending upon the last state of the toggle function block 96, that is, toggle 96 alternately causes a +½ and −½ value to be added to a pixel dot level value falling between two successive integer values. The toggle 96 switches between two states and only changes state when it receives an input designating that the dot level value associated with the measured image density level is between two successive integers. Thus, if the dot level value associated with a pixel falls between two successive integer values, a +½ or −½ is added to that value for the pixel prior to further processing in the add variable half function block 98.

For example, say a pixel has an associated image density level corresponding to a dot level value of 3.4 and the last state of toggle 96 is set to condition the add half variable to add a +½ value, then the dot level value for the pixel is read as 3.9 and in accordance with the processing scheme in the program, is rounded off to the nearest integer, in this case, 4. If the last state of toggle 96 is set to cause a −½ value to be added to the pixel dot level value, the pixel value is read as 2.9 and is rounded off to 3. It will be seen that a number of adjacent side-by-side pixels all having a dot level value of 3.4, produce an average dot level value of 3.5 for any two adjacent side-by-side pixels [(3+4)/2=3.5 or (4+3)/2=3.5].

The value +½ or −½ is coded as a digitally formatted word which digital coding is compatible with the digitally formatted word coding for the graphics information normally processed by the controller 28.

Referring now to FIG. 6, a functional block diagram showing the major functional components of the graphics generating system of FIG. 1 including the image processing apparatus of the present invention is shown schematically therein and designated generally at 124. For purposes of explanation and illustration, a single separation negative designated at 104 is shown on a scanner designated generally by the numeral 106 which scanner operates similarly as described above by passing a beam of light designated generally at 108 through the separation negative 104. The light beam is sensed by a photodetector shown generally at 110. The output of the photodetector 110 connected to lead 112 is an analog signal having a magnitude proportional to the light beam intensity passing through the separation negative 104. The analog signal from the photodetector 110 is fed to an analog-to-digital convertor designated generally by the numeral 114 which converts the analog signal into 256 discrete intensity levels, each level of which is digitally formatted and coded in accordance with the encoding scheme used in the processor 28. The intensity level information is fed from the analog-to-digital convertor 114 via bus 116 to an image density dot level function block 118 which senses the digital coded word received via bus 116 and determines the dot level value associated with the image density level measured and detected for the associated pixel area of the graphic represented on the separation negative.

The dot level value determined in function block 118 is transmitted to the image density processing function block designated generally at 122. Function block 122 embodies the present invention and operates in accordance with the explanation given during the discussion of FIG. 5. The output of function block 122 is also a digitally formatted word which is transmitted via lead 126 to a look-up table function block designated generally at 128. The tables in 128 contain a number of dot patterns for printing potential dot positions comprising a pixel and each color intensity level is produced by one or more patterns as selected in accordance with operation of the controller 28 of the printing system of FIG. 1. The output signal from the look-up table function block 128 is fed to a data formatting means 130 via lead 132. The data formatting means 130 output signal is a digital word appearing on lead 136 which signal is formatted so that the ink jet printing heads contained within the dot applicator means 134 at the printing station are excited and driven at the proper time to print dots at the selected dot positions within the pixel areas of the receiving surface to generate a finished graphic having the desired gray scale color intensity levels corresponding to the image density levels of the original graphic being reproduced.

A method and apparatus for increasing the gray scale resolution of a graphic comprised of pixel areas on a receiving surface without increasing the number of potential dot positions of each pixel has been described in a preferred embodiment. It will be understood that numerous modifications and subsitutions may be made without departing from the spirit of the invention. Therefore, the invention has been described by way of illustration rather than limitation.

I claim:

1. A method for increasing the gray scale resolution of a graphic generated by an ink jet printing system, said ink jet printing system including ink jet printing means and means for controlling and operating said ink jet printing means to apply or not apply substantially equal sized dots of one color to a plurality of pixel areas located sequentially along a line scanned by said printing means and within each of which pixel areas, potential dot positions form an array identical for all pixel areas, said method comprising the steps of:

producing a sequential series of image density signals each substantially representative of the gray scale color intensity level associated with a respective one of said pixel areas;

converting said gray scale color intensity level value to an equivalent dot level value for each of said pixel areas;

comparing the dot level value associated with each of said pixel areas to a plurality of sets of dot level values, at least one set comprising integer dot level values and another set including dot level values other than integer values, each of said integer values corresponding to one of N integral color intensity values that may be represented by printing dots in said pixel dot position array;

identifying adjacent side-by-side pixel areas having dot level values corresponding to values in said another set wherein said identified pixel areas have dot level values falling between the same two successive integer values;

alternately adding one and another of a predetermined dot level value to the dot level value associated with those identified adjacent side-by-side pixel areas having dot level values between two successive integers so that the dot level value of one of the two adjacent pixel areas is increased by said one predetermined dot level value and the other is decreased by said another predetermined dot level value;

rounding off each of the increased and decreased pixel dot level values to the nearest integer value so that the resulting dot level value of one of the two pixels is one dot level value more than the dot level value of the other pixel, and printing each of said two pixels in accordance with the resulting dot level value determined such that the average of the sum of the dot level values of the two printed pixels more nearly approximates the gray scale value corresponding to the associated image density signal.

2. A method for increasing the gray scale resolution of a graphic generated by an ink jet printing system as defined in claim 1 further characterized by said one predetermined dot level value being equal to a $+\frac{1}{2}$ dot level value and said another predetermined dot level value being equal to a $-\frac{1}{2}$ dot level value.

3. In an ink jet printing system for generating graphics including means for controlling and operating an ink jet printing means to apply or not apply substantially equal sized dots of one color to a plurality of pixel areas located sequentially along a line scanned by said printing means and within each of which pixel areas, potential dot positions form an array identical for all pixel areas, image processing apparatus for increasing the gray scale resolution of a generated graphic, comprising:

means for producing a sequential series of image density signals each substantially representative of the gray scale color intensity level associated with a respective one of said pixel areas;

means for converting each of said image density signals to a dot level value for each of said pixel areas;

means for comparing the dot level value associated with each of said pixel areas to a plurality of sets of dot level values, at least one set comprising integer dot level values and another set including dot level values other than integer values, each of said integer values corresponding to one of N integral color intensity values that may be represented by printing dots in said pixel dot position array;

means for indentifying adjacent side-by-side pixel areas having dot level values corresponding to values in said another set and selecting from said indentified adjacent pixel areas those pixel areas having dot level values falling between the same two successive integer values;

means for alternately adding one and another of a predetermined dot level value to the dot level value associated with said indentified adjacent side-by-side pixel areas having dot level values between the same two successive integers so that the dot level value of one of the two adjacent pixel areas is increased by said one predetermined dot level value and the other ' is decreased by said another predetermined dot level value;

means for rounding off to the nearest integer value the dot level value of each of said increased and decreased pixel dot level values so that the resulting dot level value of one of said two adjacent pixels is one dot level value more than the dot level value of the other of said two adjacent pixels, and means for printing each of said two adjacent pixels in accordance with the resulting dot level value determined such that the resulting gray scale color intensity represented by adjacent printed pixels is the average of the sum of the dot level values of the two printed pixels and more nearly approximates the gray scale color intensity level corresponding to the associated image density signal.

4. In an ink jet printing system, image processing apparatus as defined in claim 3 further characterized in that said means for alternately adding includes said one predetermined dot level value being equal to a $+\frac{1}{2}$ dot level value and said another predetermined dot level value being equal to a $-\frac{1}{2}$ dot level value.

* * * * *